US009286687B1

(12) United States Patent
Panchumarthy et al.

(10) Patent No.: US 9,286,687 B1
(45) Date of Patent: Mar. 15, 2016

(54) SYSTEM AND METHOD FOR ESTIMATING THE MAGNETIZATION STATES OF A NANOMAGNET ARRAY

(71) Applicants: Ravi Panchumarthy, Tampa, FL (US); Dinuka K. Karunaratne, Tampa, FL (US); Sudeep Sarkar, Tampa, FL (US); Sanjukta Bhanja, Tampa, FL (US)

(72) Inventors: Ravi Panchumarthy, Tampa, FL (US); Dinuka K. Karunaratne, Tampa, FL (US); Sudeep Sarkar, Tampa, FL (US); Sanjukta Bhanja, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 14/467,686

(22) Filed: Aug. 25, 2014

Related U.S. Application Data

(60) Provisional application No. 61/869,345, filed on Aug. 23, 2013.

(51) Int. Cl.
| | |
|---|---|
| *G06K 9/34* | (2006.01) |
| *G06T 7/00* | (2006.01) |
| *G01Q 60/24* | (2010.01) |
| *G01Q 60/50* | (2010.01) |
| *G06K 9/62* | (2006.01) |

(52) U.S. Cl.
CPC .............. *G06T 7/0081* (2013.01); *G01Q 60/24* (2013.01); *G01Q 60/50* (2013.01); *G06K 9/6217* (2013.01); *G06T 2207/20112* (2013.01)

(58) Field of Classification Search
USPC .......... 382/173, 171; 250/306, 307; 210/222, 210/695; 257/421; 324/244, 251, 309, 322; 360/125.4, 122, 125.57; 362/259, 553; 372/9; 73/105
See application file for complete search history.

(56) References Cited

U.S. PATENT DOCUMENTS

| | | | | |
|---|---|---|---|---|
| 5,948,972 | A  * | 9/1999 | Samsavar et al. ............... | 73/105 |
| 6,267,005 | B1 * | 7/2001 | Samsavar et al. ............... | 73/105 |
| 7,100,430 | B2 * | 9/2006 | Samsavar et al. ............... | 73/105 |
| 7,415,868 | B2 * | 8/2008 | Hare et al. ...................... | 73/105 |
| 7,770,231 | B2 * | 8/2010 | Prater et al. ..................... | 850/6 |

OTHER PUBLICATIONS

Panchumarthy et al., Tool for Analysis and Quantification of Fabrication Layouts in Nanomagnet-based Computing. 11th IEEE International Conference on Nanotechnology. Portland, Oregon. 2011: 111-115.
Panchumarthy et al., Magnetic State Estimator to Characterize the Magnetic States of Nano-Magnetic Disks. IEEE Transactions on Magnetics. 2013. vol. 49 (No. 7): 1-4.
Ayub and Saini. Extraction of Ventricular Premature Beats from ECG using Soft Computing Technique. International Journal of Electronics Engineering. 2010. vol. 2 (No. 1): 155-158.

(Continued)

*Primary Examiner* — Anh Do
(74) *Attorney, Agent, or Firm* — Molly L. Sauter; Smith & Hopen, P.A.

(57) ABSTRACT

A system and method for image-processing that will facilitate automatically analyzing and estimating atomic force microscopy (AFM) images and magnetic force microscopy (MFM) images of fabricated nanomagnetic arrays to identify the magnetization states of the nanomagnets in the array. The system and method will automatically estimate the magnetization states of nanomagnetics disks into one of a plurality of energy minimum magnetization state configurations and provide an annotated image of the results of the estimation.

20 Claims, 12 Drawing Sheets
(8 of 12 Drawing Sheet(s) Filed in Color)

(56) References Cited

OTHER PUBLICATIONS

Tang and Chen. Abstract of [An algorithm for atrial premature beat classification with abnormal ECG rhythm analysis]. Chinese Journal of Medical Instrumentation. 2008. vol. 32 (No. 5): 313-315. http://www.unboundmedicine.com/medline/citation/19119646/ [An_algorithm_for_atrial_premature_beat_classification_with_abnormal_ECG_rhythm_analysis]_.

Rieta et al., Atrial Activity Extraction for Atrial Fibrillation Analysis Using Blind Source Separation. IEEE Transactions on Biomedical Engineering. 2004. vol. 51 (No. 7): 1176-1186.

Langley et al., Frequency Analysis of Atrial Fibrillation. Computers in Cardiology. 2000. vol. 27: 65-68.

Panchumarthy et al., Image Processing Tool to Characterize the Magnetic States of Nano-Magnetic Disks. 2013. Poster Presentation. Current Category: XI. Magnetic Microscopy, Imaging, and Interdisciplinary Topics. Current Sub-Category: D. Magnetic Microscopy and Imaging. Sector: iv. student: 1-9.

Gugneja et al., Paroxysmal Supraventricular Tachycardia. Medscape Reference: Drugs, Diseases, & Procedures. 2014. Date Accessed Oct. 13, 2014.: 1-18. http://emedicine.medscape.com/article1156670-overview.

* cited by examiner

TABLE I
MAGNETIZATION STATE ESTIMATION RESULTS

| nano-magnetic disk magnetization state | # of Test images | Correctly Classified | Misclassified |
|---|---|---|---|
| Single domain state | 499 | 403 (81%) | 96 (19%) |
| Vortex state | 297 | 256 (86%) | 41 (14%) |

FIG. 9

TABLE II
CORRECTLY ESTIMATED RESULTS

| | Single domain state | | | Vortex state | |
|---|---|---|---|---|---|
| MFM | MSE Output | MSE Confidence | MFM | MSE Output | MSE Confidence |
| | | 96% | | | 92% |
| | | 86% | | | 84% |
| | | 82% | | | 72% |
| | | 75% | | | 65% |

FIG. 10

TABLE III
WRONGLY ESTIMATED RESULTS

| Single domain state | | | | Vortex state | | |
|---|---|---|---|---|---|---|
| MFM | MSE Output | MSE Confidence | | MFM | MSE Output | MSE Confidence |
| | | 52% | | | | 53% |
| | | 73% | | | | 71% |
| | | 81% | | | | 79% |
| | | 75% | | | | 88% |

FIG. 11

SYSTEM AND METHOD FOR ESTIMATING THE MAGNETIZATION STATES OF A NANOMAGNET ARRAY

CROSS-REFERENCE TO RELATED APPLICATIONS

This application claims priority to U.S. Provisional Patent Application 61/869,345, entitled, "Tool for Analysis and Quantification of Fabrication Layouts in Nanomagnet-Based Computing", filed Aug. 23, 2013, the contents of which are herein incorporated by reference.

GOVERNMENT SUPPORT CLAUSE

This invention was made with government support under Grant Numbers 0829838 and 0639624 awarded by the National Science Foundation. The government has certain rights in the invention.

BACKGROUND OF THE INVENTION

Single domain nanomagnets carry significant potential in several application areas wherein the magnetic fields of the nanomagnetics are used in place of standard electrical currents and data computation. Advanced fabrication and estimation methods have created opportunities for researchers to investigate and understand the phenomena of magnetization in patterned magnetic nanostructures to use them as magnetic recording media for digital storage, magnetoresistive random access memory (MRAM), spintronics for memory technologies, nanomagnetic logic circuits, nanomagnetic processors, next generation computing elements and in the biosciences. One advantage of magnetic information systems is that they consume far less power than standard electrical systems. Also, magnetic memory systems are non-volatile, and as such, they do not lose information during shut down, resulting in a reduced boot-up time upon system restart.

It is known that nanomagnets, magnets smaller than approximately 100 nm, behave as single domain entities. These small nanomagnets can be used to represent states of computing logic such as Boolean logic or an energy minimizing coprocessor. A single domain entity is a nanomagnet with a uniform magnetization state, wherein the dimensions of the magnetic nanostructure are less than the domain wall length. Since magnets only have two possible magnetization states, the magnetization states can be used to represent ones and zeroes similar to typical binary code that is currently used by electronic microprocessors. By placing a series of single domain nanomagnet disks on a silicon substrate, the interactions between the nanomagnets can be exploited to transmit information from input to output.

Magnetic data storage and data computation with nanomagnets depends on the geometric placement of the nanomagnet disks on the silicon substrate. The nature of the interactions between the nanomagnets is controlled by the topology of the placement of the nanomagnets to achieve various logic gates. Thus, the layout is an important factor for accurate data computation utilizing nanomagnets. Any irregularities present in the placement of the nanomagnets with respect to the desired CAD (computer-aided design) base layout may result in computational errors. Hence, inspection of the fabricated nanomagnet assembly for geometric irregularities is vital.

In the prior art, a person, assisted by an image-viewer, analyzes atomic force microscopy (AFM) and/or magnetic force microscopy (MFM) images of a nanomagnet disk array to identify geometric irregularities. AFM and MFM images generally capture images at depths of nanometers. Often, the image-viewer is a microscope and the person must manually examine the nanomagnets to compare them to an expected base layout. This prior art method of analysis is tedious and error prone. While there are some software tools capable of analyzing AFM images, these tools do not provide feedback on how closely the fabricated nanomagnet disk array resembles the base layout.

Additionally, Magnetic force microscopy (MFM) has made it possible for researchers to visually examine the magnetization states of single domain nanomagnets. However, MFM images have low signal to noise ration (SNR), which makes it difficult to estimate and collect qualitative results of the magnetization states of the nanomagnets in a nanomagnet array. The current practice is to visually estimate the state of the magnetic nanostructures from an MFM image, which can be a tedious process and is prone to variability from user to user, particularly as the dimensions of the magnetic nanostructures are reduced.

Accordingly, what is needed in the art is an image processing system that automatically estimates the magnetization states of patterned magnetic nanostructures based upon acquired MFM images of the patterned nanostructure.

SUMMARY OF THE INVENTION

The following paragraphs present a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The present invention provides a system and method for estimating the magnetization state of the individual nanomagnets of a patterned nanostructure or nanomagnet array, in addition to providing a confidence value of the estimation. The magnetization state estimator of the present invention is based upon image processing coupled with a machine learning technique utilizing machine learning classifiers to estimate the magnetization state of the nanomagnets in the nanomagnet array. The magnetization state estimator utilizes training data to estimate the magnetization state of the patterned nanomagnets into one of a plurality of energy minimum magnetization state configurations, where all the spins in the nanomagnet align in one direction, or a vortex state, where the spins of the nanomagnet have a curl configuration and the spins in the center are pointing out of the plane.

In a particular embodiment, the present invention provides a method of estimating the magnetization state of each of a plurality of nanomagnets of a nanomagnet array. The method includes, obtaining an atomic force microscopy (AFM) image of a nanomagnet array comprising a plurality of nanomagnets and obtaining a magnetic force microscopy (MFM) image of the nanomagnet array. The method further includes, segmenting the AFM image to distinguish a surface characteristic region of the nanomagnet array from the plurality of nanomagnets to generate a segmented AFM image of the nanomagnet array. After the segmented AFM image has been generated, the method continues by identifying a location of each of the plurality of nanomagnets on the segmented AFM image of the nanomagnet array and identifying a location of each of the plurality of nanomagnets on the MFM image of the nanomagnet array based upon the location of each of the plurality of nanomagnets on the segmented AFM image of the nanomagnet array. To estimate the magnetic state of the nanomagnets, the method further includes, extracting one or more image features at each of the identified locations of each of the plurality of nanomagnets in the nanomagnet array on the MFM image and estimating each of the plurality of nanomagnets in the nanomagnet array as one of a plurality of energy minimum magnetization state configurations based upon the one or more image features at each of the identified locations of each of the plurality of nanomagnets in the nanomagnet array on the MFM image. An annotated magnetization state image illustrating the magnetization state estimation of each of the plurality of nanomagnets in the nanomagnet array may then be generated from the results of the estimation.

In an additional embodiment, the present invention provides a system for estimating the magnetization state of a nanomagnet array comprising a plurality of nanomagnets, includes, an image segmentation module configured for segmenting an AFM image of a nanomagnet array to distinguish a surface characteristic region of the nanomagnet array from the plurality of nanomagnets to generate a segmented AFM image of the nanomagnet array. The system further includes, an image feature extraction module configured for identifying a location of each of the plurality of nanomagnets on the segmented AFM image of the nanomagnet array, identifying a location of each of the plurality of nanomagnets on an MFM image of the nanomagnet array based upon the location of each of the plurality of nanomagnets on the segmented AFM image of the nanomagnet array and extracting one or more image features at each of the identified locations of each of the plurality of nanomagnets in the nanomagnet array on the MFM image. The system further includes a magnetization state estimator configured for estimating each of the plurality of nanomagnets in the nanomagnet array as one of a plurality of energy minimum magnetization state configurations based upon the one or more image features at each of the identified locations of each of the plurality of nanomagnets in the nanomagnet array on the MFM image. The magnetization state estimator may further be configured for generating an annotated magnetization state image illustrating the magnetization state estimation of each of the plurality of nanomagnets in the nanomagnet array.

As such, the present invention provides an image processing system and associated method that automatically estimates the magnetization states of patterned magnetic nanostructures based upon acquired MFM images of the patterned nanostructure array.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the invention, reference should be made to the following detailed description, taken in connection with the accompanying drawings, in which:

FIG. 9 is a table of the magnetization state estimation results in accordance with an exemplary embodiment of the present invention.

FIG. 10 is a table of the correctly estimated magnetization state results in accordance with an exemplary embodiment of the present invention.

FIG. 11 is a table of the wrongly estimated magnetization state results in accordance with an exemplary embodiment of the present invention.

DETAILED DESCRIPTION OF THE INVENTION

Figure 1:
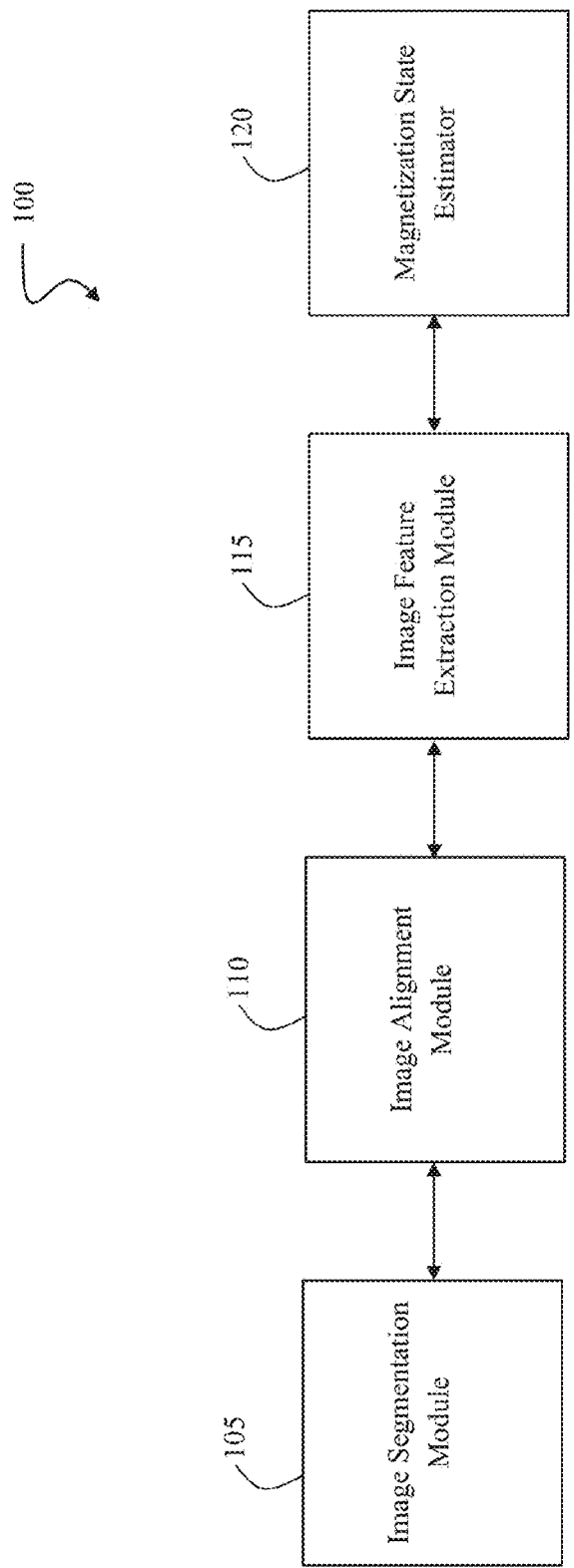
FIG. 1 is a block diagram illustrating a system for estimating the magnetization states of the nanomagnets in a nanomagnet array, in accordance with an embodiment of the present invention.

The claimed subject matter is described with reference to the drawings, wherein like reference numerals are used to refer to like elements throughout. In the following description, numerous specific details are set forth in order to provide a thorough understanding of the subject invention. It may be evident, however, that the claimed subject matter may be practiced without these specific details. In other instances, well-known structures and devices are shown in block diagram form in order to facilitate describing the subject invention.

In general, the magnetization state estimation system and method of the present invention is based on image processing techniques coupled with machine learning techniques, implemented by machine learning classifiers, such as support vector machines (SVM). Machine learning classifiers are known in the art for learning from a set of training examples, building a model and using the model to assign probabilities that new examples fall into one of two categories. Machine learning classifiers are known for both linear and non-linear estimation.

With reference to FIG. 1, a system 100 for estimating the magnetization state of a nanomagnet array comprising a plurality of nanomagnets may include an image segmentation module 105, an image alignment module 110, an image feature extraction module 115 and a magnetization state estimator 120. In general, the system 100 classifies the nanomagnets as belonging to one of a plurality of energy minimum magnetization state configurations.

Figure 2B:
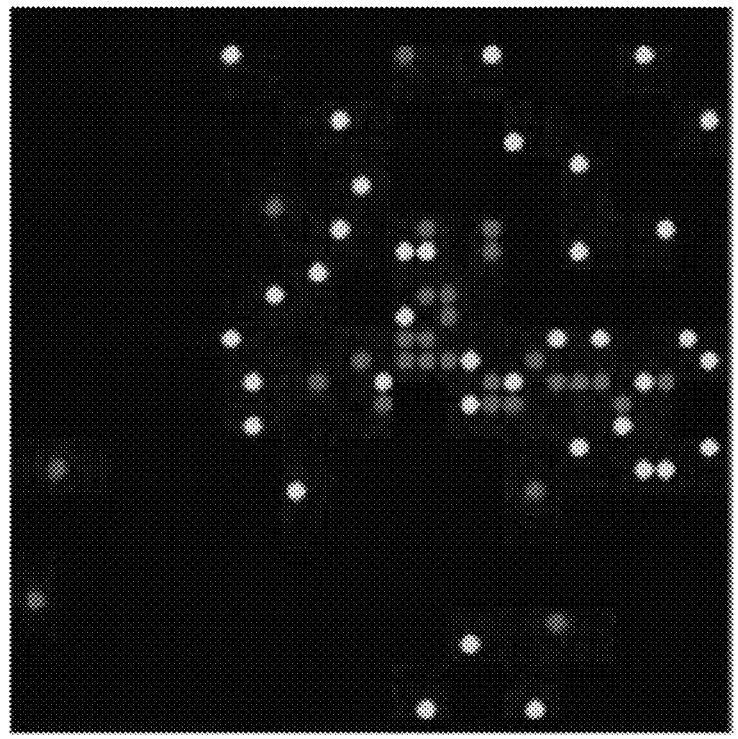
FIG. 2(b) illustrates the output of the magnetic state estimator showing the estimated states of each of the nanomagnets in the nanomagnet array in accordance with an embodiment of the present invention.
Figure 2A:
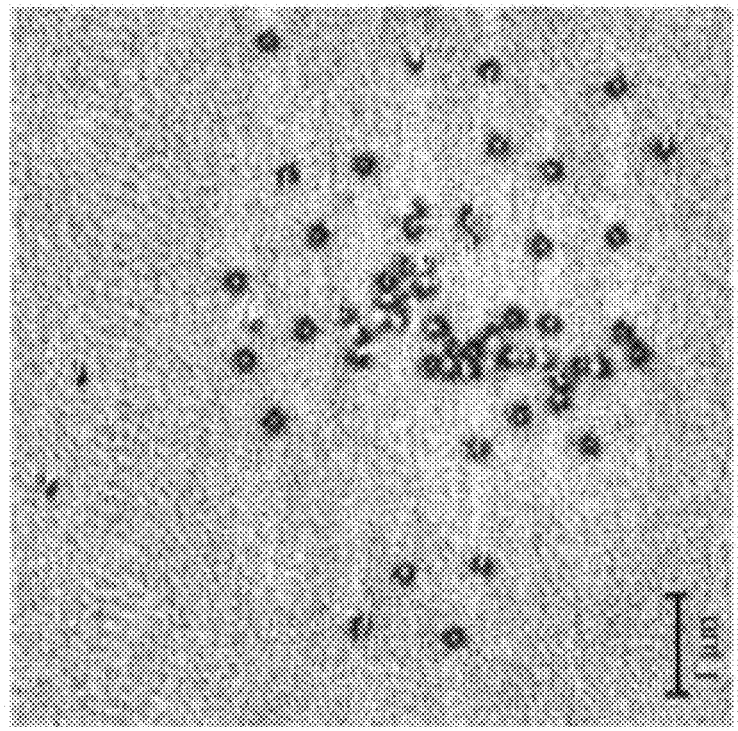
FIG. 2(a) illustrates an MFM image of a random layout of a nanomagnet array in accordance with an embodiment of the present invention.

With reference to FIG. 2(a) and FIG. 2(b), in an exemplary embodiment, the magnetization state estimation system of the present invention uses a binary class SVM and estimates magnetization states of nanomagnetic disks into either single domain state, where all the spins in a nanomagnetic disk align in one direction, or vortex state, where the spins in a nanomagnetic disk have a curl configuration and the spins in the center are pointing out of the plane, learned from training data. FIG. 2(a) illustrates an MFM image of a nanomagnetic array, and FIG. 2(b) illustrates the output of the magnetic state estimation system, where the red color represents single domain state nanomagnets and the yellow color represents vortex state nanomagnets. In this embodiment, the data was collected by fabricating a sample of Permalloy nano-magnetic disks with critical dimensions on silicon wafers by the means of a standard electron beam lithography process. To quantify the labeling performance of the invention, the automatically labelled states were compared with those labeled by an expert user. The magnetic state estimator had an accuracy of 83% estimating correctly 403 out of 499 single domain states and 256 out of 297 vortex states with a confidence value more than 80%.

Figure 3B:
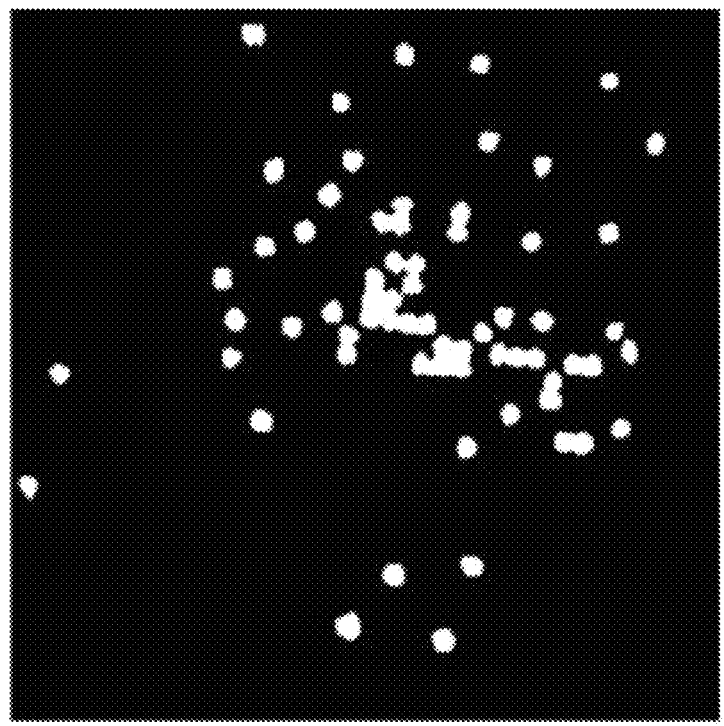
FIG. 3(b) illustrates a segmented AFM image of the nanomagnet array of FIG. 3(a) in accordance with an embodiment of the present invention.
Figure 3A:
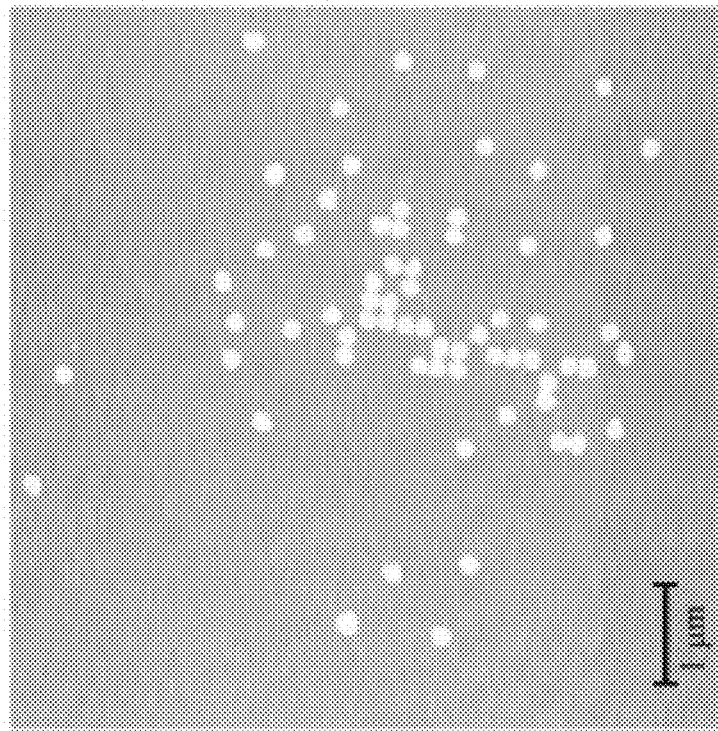
FIG. 3(a) illustrates an AFM image of a random layout of a nanomagnet array in accordance with an embodiment of the present invention.

In general, the image segmentation module 105 is effective in cleaning noise in the AFM and MFM images and for identifying individual nanostructures. AFM images have low SNR (signal-to-noise ratio), which makes it difficult to identify individual nanomagnets in the nanomagnet array from the AFM images. In the present invention, the image segmentation module 105 converts the AFM image into a gray scale image and smoothes the image using anisotropic diffusion for noise cleaning. The image segmentation module 105 additionally performs clustering to segment the image into two regions: surface characteristics and nanomagnets. In a particular embodiment, the image segmentation module 105 utilizes K-means clustering (with K=2 classes). FIG. 3(a) illustrates an AFM image of a random layout of a nanomagnet array and FIG. 3(b) illustrates the segmented AFM image that is produced by the image segmentation module. Unlike traditional filtering algorithms, which blur important regions in an image, diffusion-based noise cleaning algorithms will preserve the edges and remove the noise. The advantage of using clustering for segmentation is that the variations in pixel intensity values for the same region are addressed. Clustering is a machine learning technique to automatically detect clustering in data, in this case pixel intensity values. As such, the image segmentation module 105 is configured for segmenting an AFM image of a nanomagnet array to distinguish a surface characteristic region of the nanomagnet array from the plurality of nanomagnets to generate a segmented AFM image of the nanomagnet array.

Figure 4B:
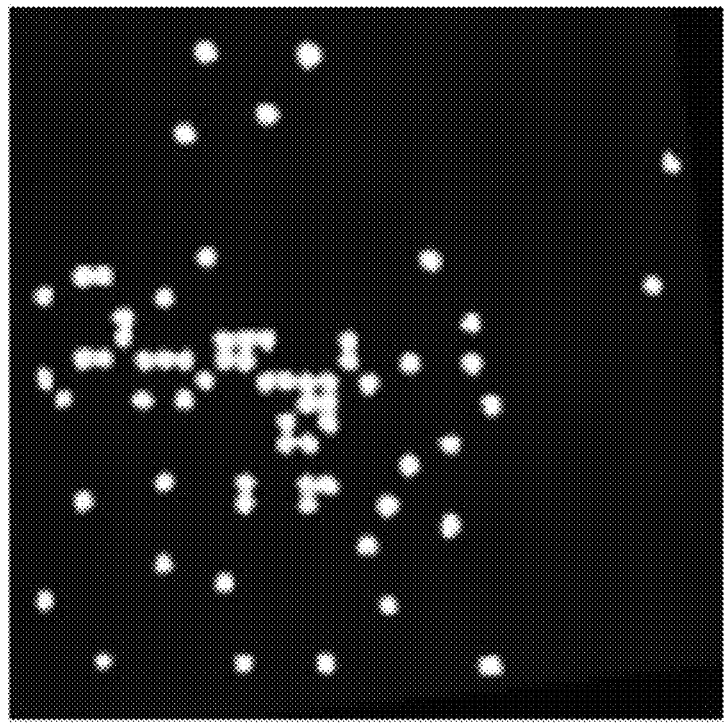
FIG. 4(b) illustrates a segmented AFM image of the nanomagnet array of FIG. 4(b) aligned with respect to the CAD layout of FIG. 4(a), in accordance with an embodiment of the present invention.
Figure 4A:
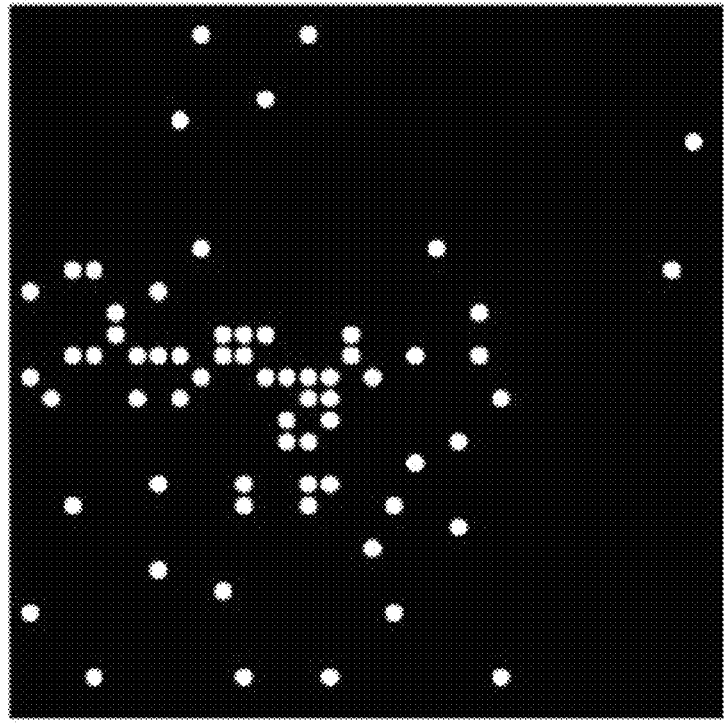
FIG. 4(a) illustrates a CAD layout of the nanomagnet array in accordance with an embodiment of the present invention.

Alignment of the AFM image with respect to the CAD layout image of the nanomagnet array is important because the alignment assists the magnetization state estimator 120 in tracking individual nanomagnet's reference across different processing stages. The image alignment module 110 performs the alignment in two stages. In the first stage, the user is presented with two images, including the base layout (CAD) image and the binarized AFM image. The user must then select three corresponding point pairs. Using these user-selected corresponding point pairs (prone to error), spatial transformation is inferred and affine transformation is performed on the AFM image, which involves a combination of 2-D geometric transformations such as rotation, shifting and/or scaling. In the second stage, the magnetization state estimator 120 calculates another set of corresponding point pairs (precise), infers spatial transformation and performs affine transformation. FIG. 4(a) illustrates the CAD layout of the nanomagnet array and FIG. 4(b) illustrates the segmented AFM image aligned with respect to the CAD layout. Traditional perspective models of imaging formation cannot be exploited due to the nature of the image formation geometry and the nanoscale imaging instruments. As such, the image alignment module 110 is configured for aligning the segmented AFM image of the nanomagnet array with a base layout image of the nanomagnet array to generate an aligned and segmented AFM image.

Figure 5B:
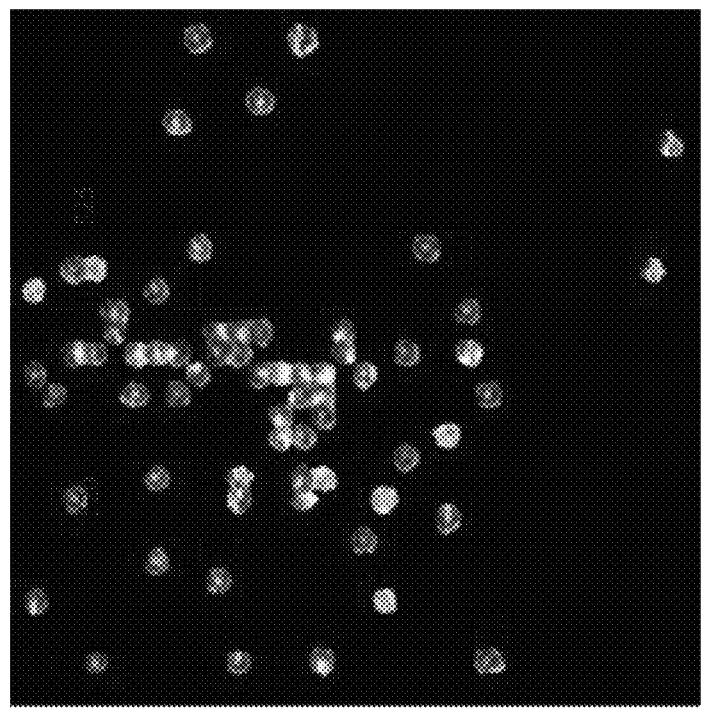
FIG. 5(b) illustrates an aligned and segmented MFM image of the nanomagnet array with respect to the CAD layout of FIG. 5(a), in accordance with an embodiment of the present invention.
Figure 5A:
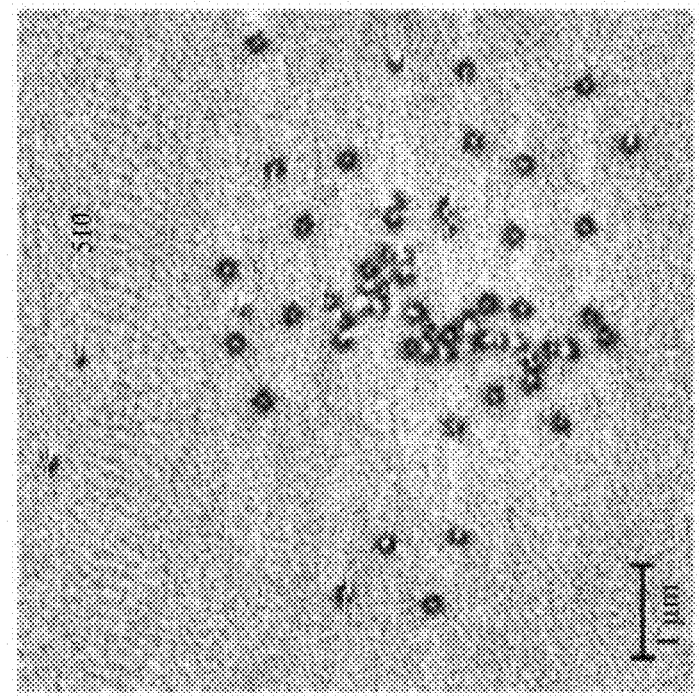
FIG. 5(a) illustrates an MFM image of the random layout of the nanomagnet array in accordance with an embodiment of the present invention.

Utilizing the image feature extraction module 115, Individual nanomagnet locations are identified using connected component analysis on the segmented AFM image. Since the nanomagnets geometry on the AFM layout precisely matches with the MFM image, individual nanomagnets on the MFM image can be identified using the same location information. For each individual nanomagnet image, image features are computed which are a combination of GIST and histogram features. GIST captures color, intensity and orientation at multiple spatial scales. FIG. 5(a) illustrates an MFM image of the CAD layout of the nanomagnet array and FIG. 5(b) illustrates the aligned and segmented MFM image with respect to the CAD layout of FIG. 5(a). As such, the image feature extraction module 115 is configured for identifying a location of each of the plurality of nanomagnets on the segmented AFM image of the nanomagnet array, identifying a location of each of the plurality of nanomagnets on an MFM image of the nanomagnet array based upon the location of each of the plurality of nanomagnets on the segmented AFM image of the nanomagnet array and extracting one or more image features at each of the identified locations of each of the plurality of nanomagnets in the nanomagnet array on the MFM image.

Figure 6:
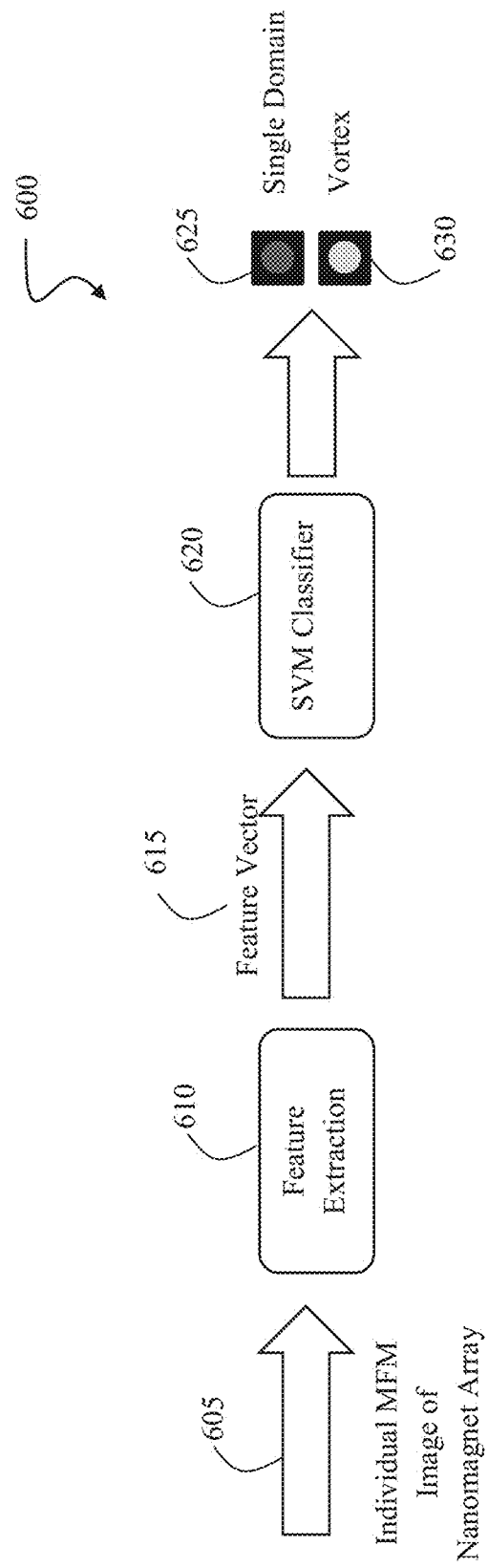
FIG. 6 is a block diagram illustrating the operation of the magnetization state estimation module in accordance with an embodiment of the present invention.

The magnetization state estimator 120 utilizes a binary class SVM with a radial basis function (RBF) kernel to estimation the magnetization state of each of the nanomagnets in the nanomagnet array. In order to estimate the magnetization state of a nanomagnet disk into either one of a plurality of energy minimum magnetization state configurations, in is necessary for the SVM to learn model parameters on a set of training data. As shown with reference to FIG. 6, the SVM calculates the model parameters based on margin maximization between the two data classes. In the magnetic state estimator 600, the individual MFM images of the nanomagnet array 605 are provided and the features of the images are extracted 610 resulting in one or more features vectors 615 which are provided to the trained SVM classifier 620, which then classifies the nanomagnet as one of a plurality of energy minimum magnetization state configurations. In this particular embodiment, the classifier 620 classifies the nanomagnet as in a single domain state 625 or a vortex state 630. As such, the magnetization state estimator 120 is configured for estimating each of the plurality of nanomagnets in the nanomagnet array as either a single domain magnetization state or a vortex magnetization state based upon the one or more image features at each of the identified locations of each of the plurality of nanomagnets in the nanomagnet array on the MFM image. The magnetization state estimator 120 is further configured for generating an annotated magnetization state image illustrating the magnetization state estimation of each of the plurality of nanomagnets in the nanomagnet array.

In an exemplary embodiment, nanomagnetics array samples were fabricated on a silicon wafer by means of electron beam lithography, e-beam evaporation and a lift-off process. Two layouts were designed on a CAD system and a scanning electron microscope, retrofitted with a nanometer pattern generation system (NPGS) operating at 30 kV is used to expose the layouts on a silicon wafer with a single layer of 950 polymethyl methacrylate (PMMA) resist. A thin film metal alloy with a very high magnetic permeability and low coercivity was evaporated using an electron beam evaporator. The sample was then placed in a heated ultrasonic acetone bath for approximately 10 minutes, which lifts off the PMMA, leaving the nanomagnetics disks intact. The samples were characterized by a SEM and an AFM to identify the defect free samples. Next, for the nanomagnetics disks to magnetically couple with each other and relax to an energy minimum state such that their magnetization could be either in single domain or vortex state, an external magnetic field in the form of a pulse was applied to the samples along the in-plane direction for stimulus. Finally, the defect free samples were characterized with a low moment MFM probe (magnetic moment of 0.3e-13 EMU) mounted on a scanning probe microscope. The captured AFM and MFM images were approximately 6 μm×6 μm and 17 instances of two different random layouts of 66 nanomagnetic disks and 140 nanomagnetic disks were captured. With the assistance of an expert MFM user, 880 single domain states and 711 vortex states were identified.

In this exemplary embodiment, a total sample size of 1591 nanomagnetic disks were used, out of which 796 samples were used for training the SVM and 795 were used for testing. The samples were connected from multiple fabrication attempts, as described above, at two layouts with 66 and 149 nanomagnetic disks, respectively. The layout with 66 nanomagnetic disks was repeatedly fabricated 8 times with different diameters on 4 silicon substrates. The nanomagnetics disks were characterized by an MFM and their magnetization states were identified to be either single domain state or vortex state by an expert MFM user. The experienced MFM user classified single domain state to be indicative of semicircles with bright and dark contrast, whereas the vortex state was indicative of a bright or dark contrasted spot in the center of the disk. This phenomenon, where the same nanomagnetics disk can have a single domain state or a vortex state depending upon the coupling energy with the neighboring disks, can only be seen if the nanomagnetics disks are designed to a critical diameter and thickness. In this exemplary embodiment, 5 fold cross-validation was performed on the training data and the tuning parameters were determined as: cost/capacity C=2 and gamma in kernel function, G=5e−4.

Figures 7A, 7B:
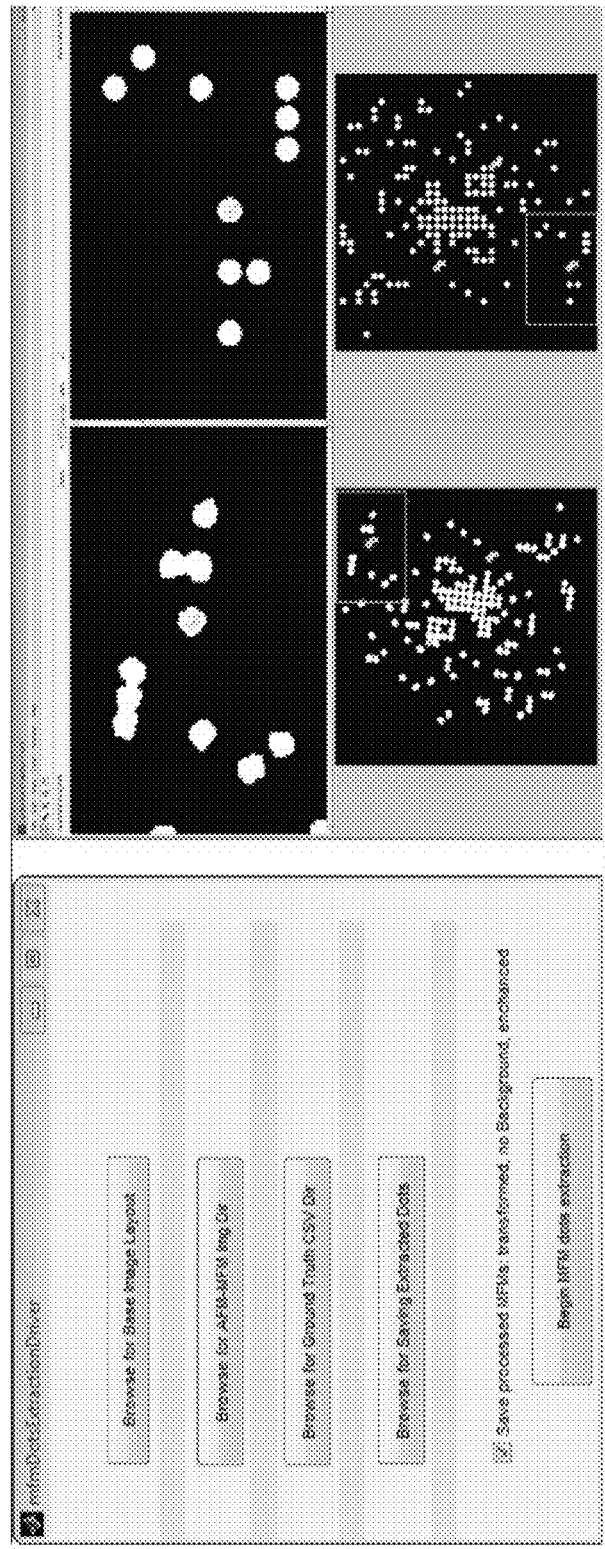
FIG. 7(a) illustrates the user interface of the magnetic state estimator for selecting the required input images, in accordance with an embodiment of the present invention.
FIG. 7(b) illustrates the magnetic state estimator corresponding points selector for the task of alignment, in accordance with an embodiment of the present invention.

As shown with reference to FIGS. 7(*a*) and 7(*b*), the magnetic state estimator of the present invention requires minimal user interaction and is easy to use. FIG. 7(*a*) illustrates a graphical user interface (GUI) for selecting the required input images (CAD, AFM, MFM). FIG. 7(*b*) illustrates the GUI to select three corresponding points on the CAD layout and the binarized AFM image, to performing the alignment of the images, and the remaining processing stages are automated. The average time taken to process 796 nanomagnets and to generate an image with annotated magnetization states is approximately four minutes. In contrast, a MFM expert would require more than a day to perform the task of estimated the magnetization states.

Figure 8A:
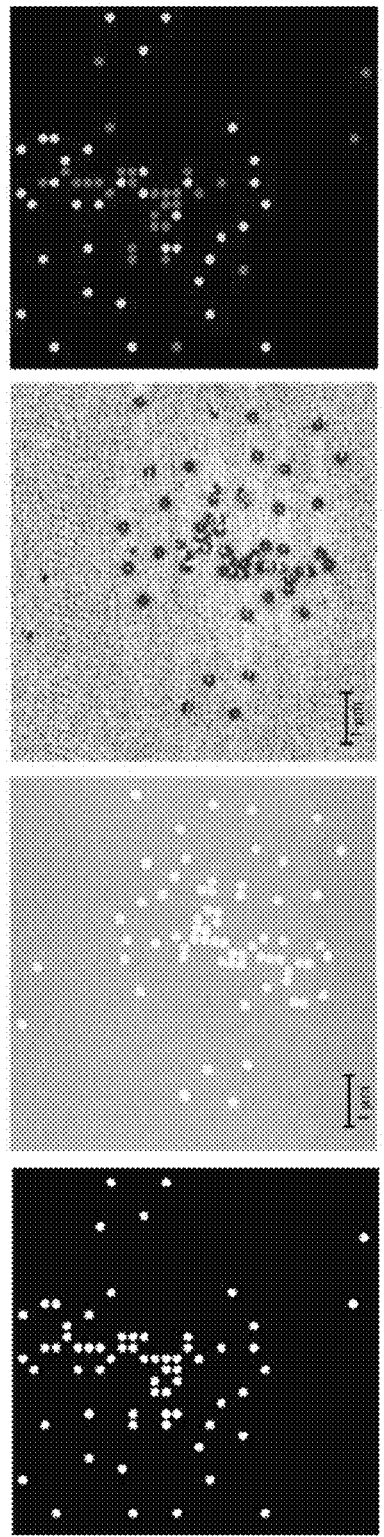
FIG. 8(a) visually illustrates the stages of the magnetization state classification method of the present invention with a nanomagnet array comprising 66 nanomagnets, in accordance with an exemplary embodiment of the present invention.
Figure 8B:
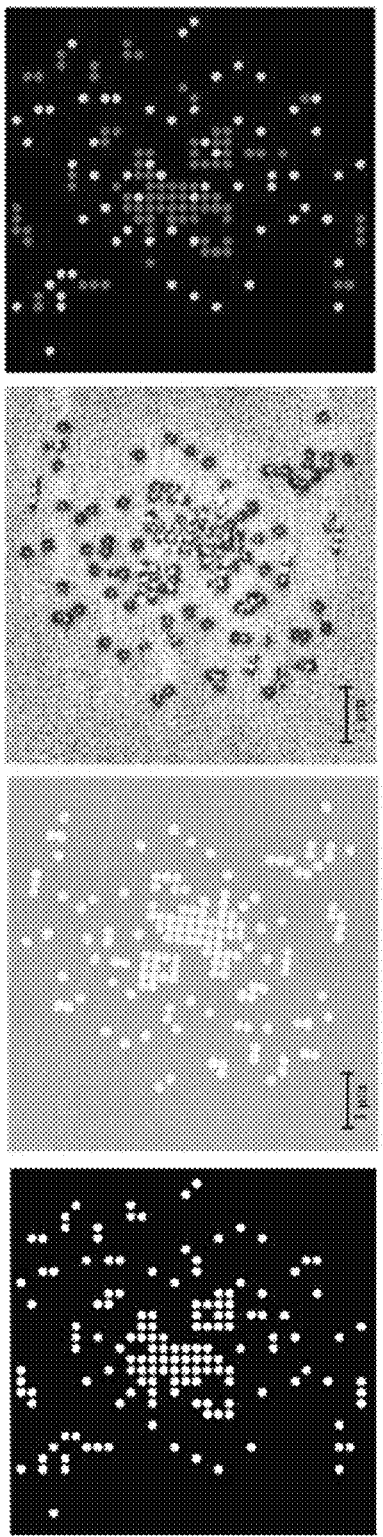
FIG. 8(b) visually illustrates the stages of the magnetization state classification method of the present invention with a nanomagnet array comprising 149 nanomagnets in accordance with an exemplary embodiment of the present invention.

In summary of the estimation process, as shown with reference to FIG. 8(*a*) and FIG. 8(*b*), the first column of the figures illustrates the CAD layout images. FIG. 8(*a*) illustrates the layout with 66 nanomagnetic disks and FIG. 8(*b*) illustrates the layout with 149 nanomagnetic disks. The second column of the figures illustrates the AFM image and the third column illustrates the AFM images of the nanomagnetic array of disks. The fourth column of the figures illustrates the annotated output of the magnetic state estimator, wherein red represents a single domain state and yellow represents a vortex state. Note that the AFM and MFM images are not aligned with the CAD layout image. But, the magnetic state estimator generates the annotated image output which is aligned with the CAD layout image.

The results of the estimation for the exemplary embodiment are illustrated by Table I, II and III of FIGS. 9, 10 and 11, respectively. Table I of FIG. 9 shows the estimation results on the testing data compared against the judgment of an expert MFM user. It is difficult and tedious for an expert MFM user to manually label each nanomagnetics state. The dimension of the nanomagnets and the separation between the nanomagnets in the fabricated layouts made the manually exceeding difficult. The testing data comprises of 796 nanomagnetic disks and the expert MFM user identified 499 single domain magnetic states and 297 vortex states. The magnetic state estimator of the present invention was able to identify 403 single domain and 256 vortex states, producing an accuracy rate of 83%.

For each MFM image of a nanomagnetic disk, the system of the present invention calculates a confidence value using a model for single domain state and vortex state. The magnetization state assigned to the nanomagnetics disk is determined by the higher confidence value. Table II of FIG. 10 illustrates a few examples of correctly identified single domain states and vortex states with their respective confidence values. Table III of FIG. 11 illustrates a few examples of misclassified magnetization states and their confidence values. This error could be reduced by improving the segmentation module in the architecture of the system. These results show that the system of the present invention will assist the MFM user to expedite the process to characterize the magnetization states.

In this exemplary embodiment, the system of the present invention produced an optimum accuracy at 50% training data and 50% testing data. By increasing the training data to more than 50% did not yield a significant increase in accuracy. Increasing the training data to more than 75%, may lead to over fitting of the data. Hence, increasing the training data after a certain point will not increase the accuracy levels. The characterization criterion after the training phase is dependent on how well the magnetic state estimator learned during the training phase. The training phase is dependent upon the training data created by the MFM user visually marking the magnetic states. The accuracy of the visually marked magnetic states by the MFM user depends upon the resolution of the AFM and MFM images. The captured AFM and MFM images of the samples in the exemplary embodiment were approximately 6 μm×6 μm and resulted in low resolution.

Even with such low resolution images, the estimator of the present invention had an accuracy of 83%.

While the exemplary embodiment and accompanying description is focused on results using nanomagnetics disks, this not meant to be limiting and the modular architecture of the magnetic state estimator allows the system to easily create new models to work with magnetic nanostructures of various shapes and dimensions with appropriate training.

In an additional embodiment, the magnetization state estimation system can be integrated into an automated tool for analysis and quantification of the fabrication layout to identify fabrication defects. The image segmentation module 105 and the image alignment module 110 can be used to generate a segmented image that can be compared to the base layout to identify fabrication defects.

Figure 12:
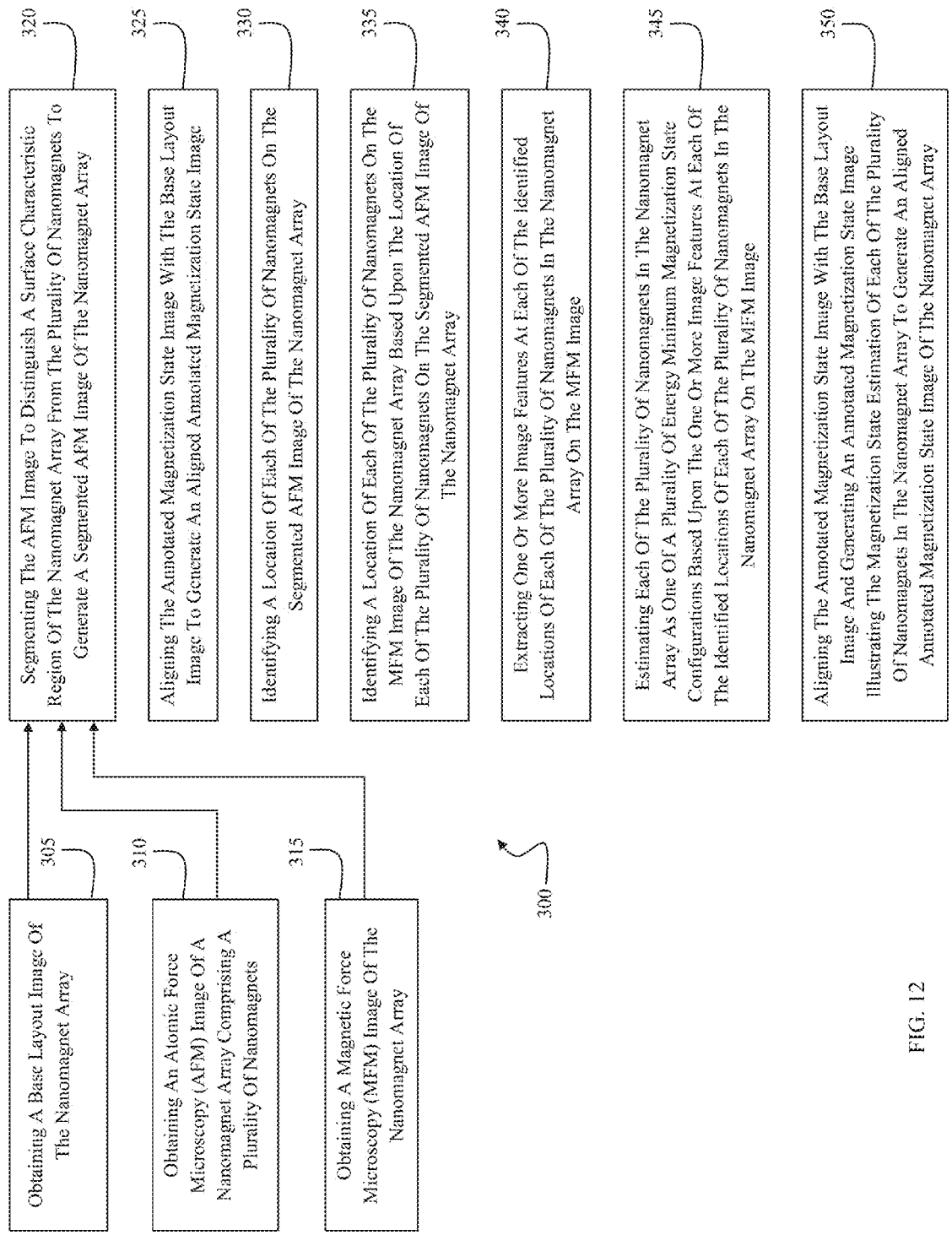
FIG. 12 is a flow diagram illustrating a method for estimating the magnetization states of the nanomagnets in a nanomagnet array, in accordance with an embodiment of the present invention.

With reference to FIG. 12, a method of estimating the magnetization state of each of a plurality of nanomagnets of a nanomagnet array 300 is provided. The method includes, obtaining a base layout image of the nanomagnet array 305, obtaining an atomic force microscopy (AFM) image of a nanomagnet array comprising a plurality of nanomagnets 310 and obtaining a magnetic force microscopy (MFM) image of the nanomagnet array 315. The layout, the AFM image and the MFM image are then provided to the system for estimating the magnetization state of each of the plurality of nanomagnets 100.

The method continues by segmenting the AFM image to distinguish a surface characteristic region of the nanomagnet array from the plurality of nanomagnets to generate a segmented AFM image of the nanomagnet array 320. The segmenting may be performed by the image segmentation module 105.

After the AFM image has been segmented, the method continues by aligning the annotated magnetization state image with the base layout image to generate an aligned annotated magnetization state image 325. The alignment may be performed by the image alignment module 110.

Following the alignment and segmentation of the AFM image, the method continues by identifying a location of each of the plurality of nanomagnets on the segmented AFM image of the nanomagnet array 330, identifying a location of each of the plurality of nanomagnets on the MFM image of the nanomagnet array based upon the location of each of the plurality of nanomagnets on the segmented AFM image of the nanomagnet array 335. After the locations have been identified, the method continues by extracting one or more image features at each of the identified locations of each of the plurality of nanomagnets in the nanomagnet array on the MFM image 340. Identifying the locations of the nanomagnets and extracting the image features at the identified locations may be performed by the image feature extraction module 115.

After the images have been segmented and aligned and the image features have been extracted from the images, the method continues by estimating each of the plurality of nanomagnets in the nanomagnet array as one of a plurality of energy minimum magnetization state configurations based upon the one or more image features at each of the identified locations of each of the plurality of nanomagnets in the nanomagnet array on the MFM image 345. After the magnetization states have been estimated. The method continues by aligning the annotated magnetization state image with the base layout image and generating an annotated magnetization state image illustrating the magnetization state estimation of each of the plurality of nanomagnets in the nanomagnet array to generate an aligned annotated magnetization state image of the nanomagnet array 350. Estimating the magnetization state of the nanomagnets and generated the annotated magnetization state image of the nanomagnet array may be performed by the magnetization state estimator 120.

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Python, MATLAB or the like and conventional procedural programming languages, such as the "C" programming language or similar programming languages, or assembly language.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method of estimating the magnetization state of each of a plurality of nanomagnets of a nanomagnet array, the method comprising:
   obtaining an atomic force microscopy (AFM) image of a nanomagnet array comprising a plurality of nanomagnets;
   obtaining a magnetic force microscopy (MFM) image of the nanomagnet array;
   segmenting the AFM image to distinguish a surface characteristic region of the nanomagnet array from the plurality of nanomagnets to generate a segmented AFM image of the nanomagnet array;
   identifying a location of each of the plurality of nanomagnets on the segmented AFM image of the nanomagnet array;
   identifying a location of each of the plurality of nanomagnets on the MFM image of the nanomagnet array based upon the location of each of the plurality of nanomagnets on the segmented AFM image of the nanomagnet array;
   extracting one or more image features at each of the identified locations of each of the plurality of nanomagnets in the nanomagnet array on the MFM image; and
   estimating an energy minimum magnetization state configuration of each of the plurality of nanomagnets using a magnetization state estimator configured to estimate each of the plurality of nanomagnets in the nanomagnet array as one of a plurality of energy minimum magnetization state configurations based upon the one or more image features at each of the identified locations of each of the plurality of nanomagnets in the nanomagnet array on the MFM image.

2. The method of claim 1, further comprising, generating an annotated magnetization state image illustrating the magnetization state estimation of each of the plurality of nanomagnets in the nanomagnet array.

3. The method of claim 1, further comprising, obtaining a base layout image of the nanomagnet array.

4. The method of claim 3, further comprising, aligning the segmented AFM image of the nanomagnet array with the base layout image of the nanomagnet array to generate an aligned and segmented AFM image.

5. The method of claim 3, further comprising, aligning the annotated magnetization state image with the base layout image to generate an aligned annotated magnetization state image.

6. The method of claim 1, wherein segmenting the AFM image to distinguish a surface characteristic region of the nanomagnet array from the plurality of nanomagnets to generate a segmented AFM image of the nanomagnet array further comprises:
   converting the AFM image into a gray scale AFM image;
   smoothing the gray scale AFM image using a diffusion-based noise cleaning algorithm; and
   performing clustering of the smoothed gray scale AFM image to segment the image into surface characteristics and nanomagnetics.

7. The method of claim 1, wherein identifying a location of each of the plurality of nanomagnets on the segmented AFM image of the nanomagnet array further comprises, using connected component analysis on the segmented AFM image.

8. The method of claim 1, wherein the one or more image features comprise GIST features and histogram features.

9. The method of claim 8, where GIST features comprise color, intensity and orientation at multiple spatial scales.

10. The method of claim 1, wherein estimating an energy minimum magnetization state configuration of each of the plurality of nanomagnets using a magnetization state estimator configured to estimate each of the plurality of nanomagnets in the nanomagnet array as one of a plurality of energy minimum magnetization state configurations based upon the one or more image features at each of the identified locations of each of the plurality of nanomagnets in the nanomagnet array on the MFM image further comprises, estimating each of the plurality of nanomagnets using a machine learning classifier of the magnetization state estimator.

11. The method of claim 10, wherein estimating an energy minimum magnetization state configuration of each of the plurality of nanomagnets using a magnetization state estimator configured to estimate each of the plurality of nanomagnets using a machine learning classifier further comprises, the machine learning classifier learning one or more model parameters based upon a set of training data.

12. The method of claim 1, wherein estimating an energy minimum magnetization state configuration of each of the plurality of nanomagnets using a magnetization state estimator configured to estimate each of the plurality of nanomagnets in the nanomagnet array as one of a plurality of energy minimum magnetization state configurations based upon the one or more image features at each of the identified locations of each of the plurality of nanomagnets in the nanomagnet array on the MFM image further comprises, calculating a first confidence value for a first one of the plurality of energy minimum magnetization state configurations and calculating a second confidence value for a second one of the plurality of energy minimum magnetization state configurations for each of the plurality of nanomagnets and estimating each of the plurality of nanomagnets based upon the first confidence value and the second confidence value.

13. A method of estimating the magnetization state of each of a plurality of nanomagnets of a nanomagnet array, the method comprising:
   obtaining a base layout image of the nanomagnet array;

obtaining an atomic force microscopy (AFM) image of a nanomagnet array comprising a plurality of nanomagnets;

obtaining a magnetic force microscopy (MFM) image of the nanomagnet array;

segmenting the AFM image to distinguish a surface characteristic region of the nanomagnet array from the plurality of nanomagnets to generate a segmented AFM image of the nanomagnet array;

aligning the annotated magnetization state image with the base layout image to generate an aligned annotated magnetization state image;

identifying a location of each of the plurality of nanomagnets on the segmented AFM image of the nanomagnet array;

identifying a location of each of the plurality of nanomagnets on the MFM image of the nanomagnet array based upon the location of each of the plurality of nanomagnets on the segmented AFM image of the nanomagnet array;

extracting one or more image features at each of the identified locations of each of the plurality of nanomagnets in the nanomagnet array on the MFM image;

estimating an energy minimum magnetization state configuration of each of the plurality of nanomagnets using a magnetization state estimator configured to estimate each of the plurality of nanomagnets in the nanomagnet array as one of a plurality of energy minimum magnetization state configurations based upon the one or more image features at each of the identified locations of each of the plurality of nanomagnets in the nanomagnet array on the MFM image; and aligning the annotated magnetization state image with the base layout image and generating an annotated magnetization state image illustrating the magnetization state estimation of each of the plurality of nanomagnets in the nanomagnet array to generate an aligned annotated magnetization state image of the nanomagnet array.

14. A system for estimating the magnetization state of a nanomagnet array comprising a plurality of nanomagnets, the system comprising:

an image segmentation module configured for segmenting an AFM image of a nanomagnet array to distinguish a surface characteristic region of the nanomagnet array from the plurality of nanomagnets to generate a segmented AFM image of the nanomagnet array;

an image feature extraction module configured for identifying a location of each of the plurality of nanomagnets on the segmented AFM image of the nanomagnet array, identifying a location of each of the plurality of nanomagnets on an MFM image of the nanomagnet array based upon the location of each of the plurality of nanomagnets on the segmented AFM image of the nanomagnet array and extracting one or more image features at each of the identified locations of each of the plurality of nanomagnets in the nanomagnet array on the MFM image; and a magnetization state estimator configured for estimating each of the plurality of nanomagnets in the nanomagnet array as one of a plurality of energy minimum magnetization state configurations based upon the one or more image features at each of the identified locations of each of the plurality of nanomagnets in the nanomagnet array on the MFM image.

15. The system of claim 14, wherein the magnetization state estimator is further configured for generating an annotated magnetization state image illustrating the magnetization state estimation of each of the plurality of nanomagnets in the nanomagnet array.

16. The system of claim 14, further comprising, an image alignment module configured for aligning the segmented AFM image of the nanomagnet array with a base layout image of the nanomagnet array to generate an aligned and segmented AFM image.

17. The system of claim 14, wherein the magnetization state estimator is further configured for aligning the annotated magnetization state image with a base layout image of the nanomagnet array to generate an aligned annotated magnetization state image.

18. The system of claim 14, wherein the image segmentation module is further configured for converting the AFM image into a gray scale AFM image, smoothing the gray scale AFM image using a diffusion-based noise cleaning algorithm and performing clustering of the smoothed gray scale AFM image to segment the image into surface characteristics and nanomagnetics.

19. The system of claim 14, wherein the magnetization state estimator is further configured for estimating each of the plurality of nanomagnets using a machine learning classifier.

20. The system of claim 14, wherein the magnetization state estimator is further configured for estimating each of the plurality of nanomagnets in the nanomagnet array as one of a plurality of energy minimum magnetization state configurations based upon the one or more image features at each of the identified locations of each of the plurality of nanomagnets in the nanomagnet array on the MFM image further comprises, calculating a first confidence value for a first one of the plurality of energy minimum magnetization state configurations and calculating a second confidence value for a second one of the plurality of energy minimization magnetization state configurations for each of the plurality of nanomagnets and estimating each of the plurality of nanomagnets based upon the first confidence value and the second confidence value.

* * * * *